United States Patent
Peters

(10) Patent No.: US 9,498,838 B2
(45) Date of Patent: Nov. 22, 2016

(54) SYSTEM AND METHOD OF CONTROLLING HEAT INPUT IN TANDEM HOT-WIRE APPLICATIONS

(71) Applicant: Lincoln Global, Inc., City of Industry, CA (US)

(72) Inventor: Steven R. Peters, Huntsburg, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 406 days.

(21) Appl. No.: 13/949,932

(22) Filed: Jul. 24, 2013

(65) Prior Publication Data

US 2015/0028012 A1    Jan. 29, 2015

(51) Int. Cl.
| | |
|---|---|
| B23K 9/09 | (2006.01) |
| B23K 9/10 | (2006.01) |
| B23K 9/12 | (2006.01) |
| B23K 9/173 | (2006.01) |

(52) U.S. Cl.
CPC ............. *B23K 9/092* (2013.01); *B23K 9/091* (2013.01); *B23K 9/1043* (2013.01); *B23K 9/122* (2013.01); *B23K 9/125* (2013.01); *B23K 9/1735* (2013.01)

(58) Field of Classification Search
CPC ........ B23K 9/02; B23K 9/092; B23K 9/091; B23K 9/09; B23K 9/173; B23K 9/10; B23K 26/14
IPC .............. B23K 9/02, 9/092, 9/091, 9/09, 9/173, B23K 9/10, 26/14
See application file for complete search history.

(56) References Cited

U.S. PATENT DOCUMENTS

| | | |
|---|---|---|
| 4,467,176 A | 8/1984 | Mizuno et al. |
| 4,614,856 A | 9/1986 | Hori et al. |
| 4,737,612 A | 4/1988 | Bruck et al. |
| 4,788,412 A | 11/1988 | Hori et al. |
| 4,803,334 A | 2/1989 | Burke et al. |
| 4,866,247 A | 9/1989 | Parks et al. |

(Continued)

FOREIGN PATENT DOCUMENTS

| | | |
|---|---|---|
| CA | 2740615 | 7/2010 |
| DE | 2501928 | 1/1975 |

(Continued)

OTHER PUBLICATIONS

Digital Communications Improves Productivity, Quality and Safety, NX-1.20, Mar. 2006, www.lincolnelectric.com,pp.

(Continued)

*Primary Examiner* — Brian Jennison
(74) *Attorney, Agent, or Firm* — Perkins Coie LLP

(57) ABSTRACT

A system and method is provided. The system includes a high intensity energy source to create a molten puddle on a surface of a workpiece and a wire feeder that feeds a wire to the molten puddle via a contact tube. The system also includes a power supply that outputs a first heating current during a first mode of operation and a second heating current during a second mode of operation. The system further includes a controller that initiates the first mode of operation in the power supply to heat the wire to a desired temperature and switches the power supply from the first mode of operation to the second mode of operation to create a micro-arc. The second mode of operation provides at least one of an increased heat input to the molten puddle and an increased agitation of the molten puddle relative to the first mode of operation.

20 Claims, 9 Drawing Sheets

(56) References Cited

U.S. PATENT DOCUMENTS

| | | |
|---|---|---|
| 4,972,064 A | 11/1990 | Stava |
| 5,148,001 A | 9/1992 | Stava |
| 5,278,390 A | 1/1994 | Blankenship |
| 5,343,016 A | 8/1994 | Davis et al. |
| 5,714,735 A | 2/1998 | Offer |
| 5,793,009 A | 8/1998 | Offer |
| 5,958,261 A | 9/1999 | Offer et al. |
| 5,994,659 A | 11/1999 | Offer |
| 6,023,043 A | 2/2000 | Manabe et al. |
| 6,034,343 A | 3/2000 | Hashimoto et al. |
| 6,051,810 A | 4/2000 | Stava |
| 6,191,379 B1 | 2/2001 | Offer et al. |
| 6,498,321 B1 | 12/2002 | Fulmer et al. |
| 6,521,861 B2 | 2/2003 | Jones et al. |
| 6,600,135 B2 * | 7/2003 | Tong ............... B23K 9/09 219/130.51 |
| 6,989,507 B2 | 1/2006 | Clark |
| 7,109,439 B2 | 9/2006 | Stava |
| 7,408,130 B2 | 8/2008 | Sonoda et al. |
| 7,842,900 B2 | 11/2010 | Longfield et al. |
| 2004/0074884 A1 | 4/2004 | Butler et al. |
| 2007/0056942 A1 | 3/2007 | Daniel et al. |
| 2007/0119829 A1 | 5/2007 | Vietz et al. |
| 2007/0164007 A1 | 7/2007 | Peters et al. |
| 2007/0235429 A1 | 10/2007 | Revel et al. |
| 2008/0006612 A1 | 1/2008 | Peters et al. |
| 2008/0128395 A1 | 6/2008 | Aigner et al. |
| 2009/0230099 A1 | 9/2009 | Aalto et al. |
| 2010/0176109 A1 | 7/2010 | Peters et al. |
| 2010/0206856 A1 | 8/2010 | Tanaka et al. |
| 2010/0326969 A1 | 12/2010 | Tsukamoto et al. |
| 2011/0000890 A1 | 1/2011 | Arjakine et al. |
| 2011/0042361 A1 | 2/2011 | Nowak et al. |
| 2011/0259853 A1 | 10/2011 | Yamazaki et al. |
| 2011/0297658 A1 | 12/2011 | Peters et al. |
| 2013/0043219 A1 | 2/2013 | Peters et al. |
| 2013/0256288 A1 | 10/2013 | Matthews et al. |
| 2014/0001166 A1 | 1/2014 | Peters et al. |

FOREIGN PATENT DOCUMENTS

| | | |
|---|---|---|
| DE | 2545075 | 10/1975 |
| DE | 4412093 | 10/1995 |
| EP | 0304855 | 8/1988 |
| EP | 1454703 | 9/2006 |
| EP | 1920864 | 5/2008 |
| JP | 58-3784 A | 1/1983 |
| JP | 09-201687 | 8/1997 |
| JP | 2002-103040 A | 4/2002 |
| JP | 2002239731 | 8/2002 |
| KR | 20040034774 | 4/2004 |
| WO | WO 2010/082081 | 7/2010 |

OTHER PUBLICATIONS

Power Wave 445M Robotic & Power Wave 445M/STT Robotic, Publication E10.90 Apr. 2003, www.lincolnelectric.com, pp. 1-8.
International Application No. PCT/IB2014/001306, International Search Report & Written Opinion, 9 pages, Jan. 15, 2015.

* cited by examiner

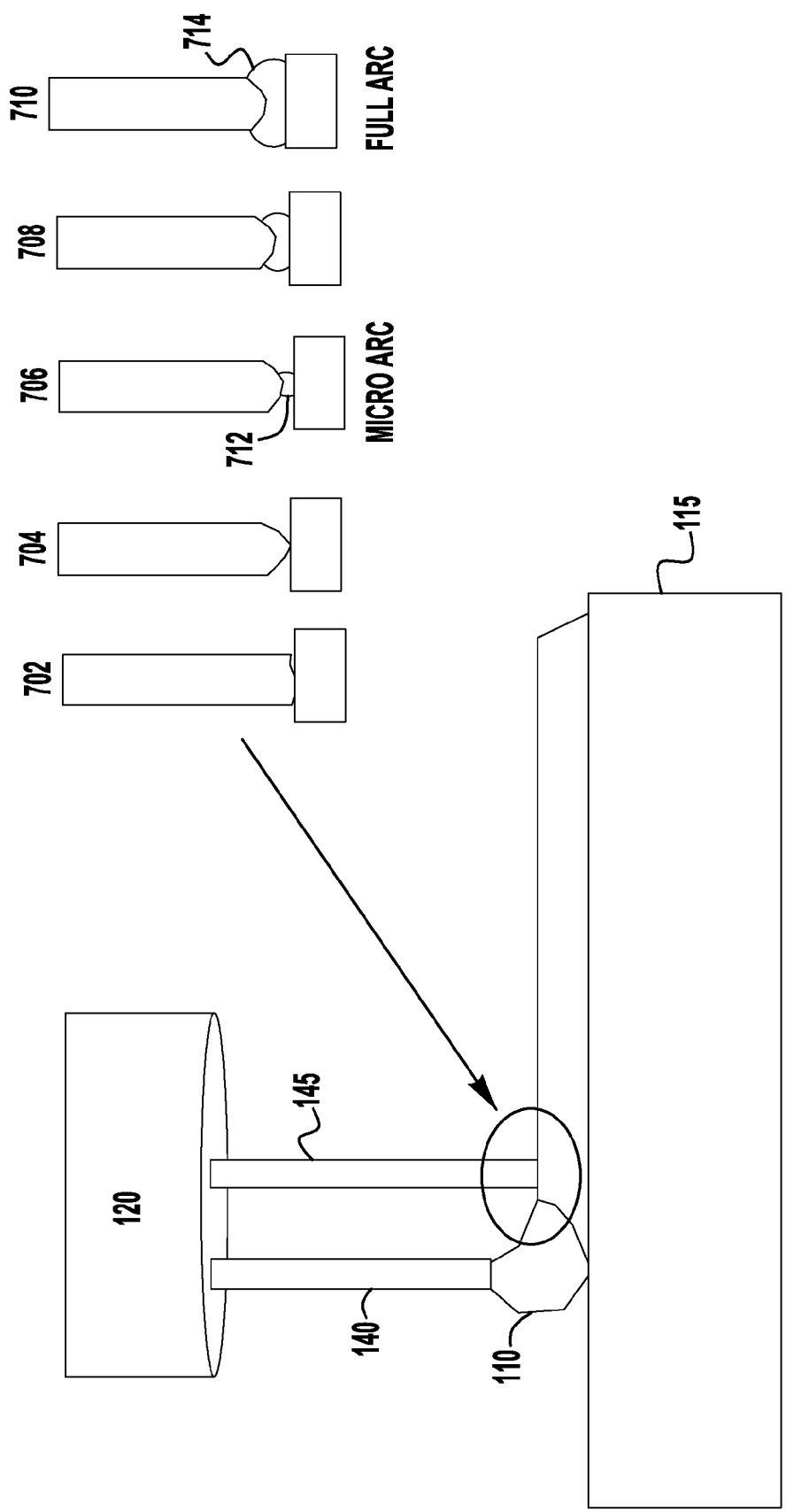

SYSTEM AND METHOD OF CONTROLLING HEAT INPUT IN TANDEM HOT-WIRE APPLICATIONS

BACKGROUND OF THE INVENTION

1. Field of the Invention

Systems and methods of the present invention relate to welding, joining, cladding, building-up, and brazing applications, and more specifically to tandem hot-wire systems.

2. Description of the Related Art

As advancements in welding have occurred, the demands on welding throughput have increased. Because of this, various systems have been developed to increase the speed of welding operations, including systems which use multiple welding power supplies in which one power supply is used to create an arc in a consumable electrode to form a weld puddle and a second power supply is used to heat a filler wire in the same welding operation. While these systems can increase the speed or deposition rate of a welding operation, the power supplies are limited in their function and ability to vary heat input in order to optimize the process such as, e.g., welding, joining, cladding, building-up, brazing, etc. Thus, improved systems are desired.

BRIEF SUMMARY OF THE INVENTION

Exemplary embodiments of the present invention include systems and methods in which current waveforms of at least one power supply is varied to achieve a desired heat input in order to optimize processes such as, e.g., welding, joining, cladding, building-up, brazing, etc. In some embodiments, the system includes a high intensity energy source to create a molten puddle on a surface of a workpiece and a wire feeder that feeds a wire to the molten puddle via a contact tube. The system also includes a hot-wire power supply that outputs a first heating current during a first mode of operation and a second heating current during a second mode of operation. The hot-wire power supply provides the first heating current or the second heating current to the wire via the contact tube. The system further includes a controller that initiates the first mode of operation in the hot-wire power supply to heat the wire to a desired temperature and then switches the hot-wire power supply from the first mode of operation to the second mode of operation to create a micro-arc, which is created between the wire and the workpiece. The second mode of operation provides at least one of an increased heat input to the molten puddle and an increased agitation of the molten puddle relative to the first mode of operation. In some embodiments, the controller controls the duration of the micro-arc during the second mode of operation. The micro-arc is extinguished when the output of the hot-wire power supply is turned off or reduced in power to a point that the micro-arc is not sustainable.

In some embodiments, the controller controls a frequency of the micro-arcs during the second mode of operation by changing an initial setpoint of the second heating current or a ramp rate from the initial setpoint to current values corresponding to the micro-arcs. In addition, some embodiments can include a circuit to suppress at least one of an induced current and the micro-arc when the hot-wire power supply is off or reduced in power to extinguish the micro-arc.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which:

FIG. 7 illustrates an exemplary transition from a short condition to a micro-arc stage and then to a full arc stage for a hot wire process that is consistent with the present invention;

DETAILED DESCRIPTION OF EXEMPLARY EMBODIMENTS

Figure 1:
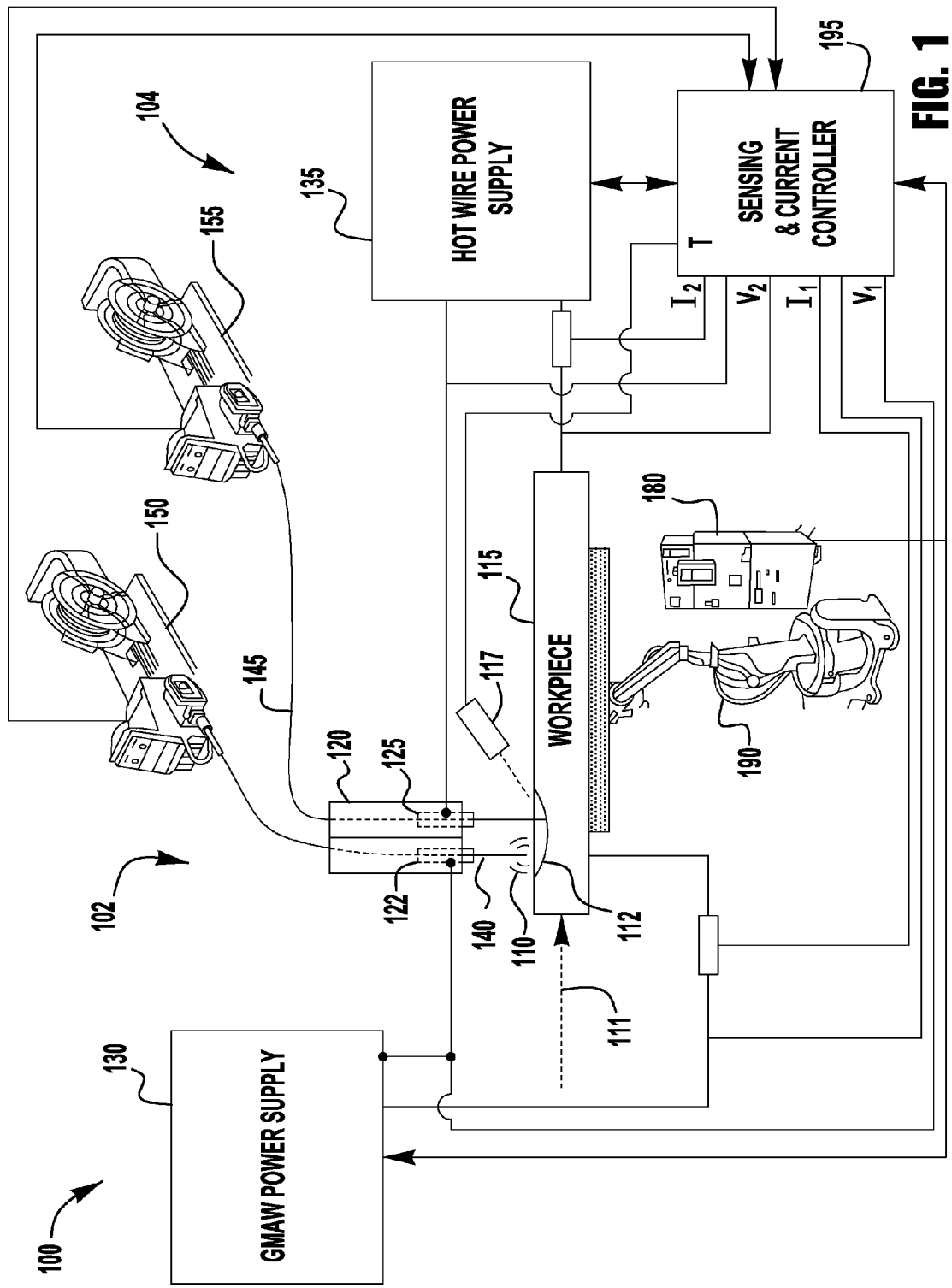
FIG. 1 is a diagrammatical representation of an exemplary embodiment of a welding system according to the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

An exemplary embodiment of this is shown in FIG. 1, which shows a system 100. The system 100 illustrates a tandem hot wire configuration that includes a high intensity energy system 102 and a hot wire system 104. The high intensity energy system 102, which in the exemplary embodiment of FIG. 1 is configured as a GMAW system, heats the workpiece 115 to create a molten puddle 112, i.e., a weld puddle. Although the high intensity energy system 102 is illustrated as a GMAW system, the present invention is not limited to this exemplary embodiment and, in other exemplary embodiments, the high intensity energy system 102 can be a TIG, PAW, Laser Welding, FCAW, MCAW, or SAW system. In addition, embodiments of the present invention can be used in applications involving joining/welding, cladding, building-up, brazing, combinations of these, etc. Of course, with TIG and PAW, the welding electrode is not a consumable electrode, and with a Laser Welding System, a laser beam is used to heat the workpiece 115 to create the puddle 112 instead of an arc.

Turning to FIG. 1 in which the exemplary GMAW embodiment is illustrated, the system 102 includes a power supply 130, a wire feeder 150, and a torch unit 120 that includes a contact tube 122 for consumable welding electrode (wire) 140. The power supply 130 provides a welding waveform that creates an arc 110 between the welding electrode 140 and workpiece 115. The welding electrode 140 is delivered to the molten puddle 112 created by the arc 110 by the wire feeder 150 via the contact tube 122. Along with creating the molten puddle 112, the arc 110 transfers droplets of the welding wire 140 to the molten puddle 112. The operation of a GMAW welding system of the type described herein is well known to those skilled in the art and need not be described in detail herein. Not shown in FIG. 1 is a shielding gas system or sub arc flux system which can be used in accordance with known methods.

The hot wire system 104 includes a wire feeder 155 feeding a filler wire 145 to the weld puddle 112 via contact tube 125 that is included in torch unit 120. The hot wire system 104 also includes a power supply 135 that resistance heats the filler wire 145 via contact tube 125 prior to the wire 145 entering the molten puddle 112. The power supply 135 heats the wire 145 to a desired temperature, e.g., to at or near a melting temperature of the wire 145. Thus, in this exemplary system, the hot wire system 104 adds an additional consumable to the molten puddle 112. The system 100 can also include a motion control subsystem that includes a motion controller 180 operatively connected to a robot 190. The motion controller 180 controls the motion of the robot 190. The robot 190 is operatively connected (e.g., mechanically secured) to the workpiece 115 to move the workpiece 115 in the direction 111 such that the torch unit 120 (with contact tubes 120 and 125) effectively travels along the workpiece 115. Of course, the system 100 can be configured such that the torch unit 120 can be moved instead of the workpiece 115.

As is generally known, arc generation systems, such as GMAW, use high levels of current to generate the arc 110 between the advancing welding consumable 140 and the molten puddle 112 on the workpiece 115. To accomplish this, many different arc welding current waveforms can be utilized, e.g., current waveforms such as constant current, pulse current, etc.

Figure 2:
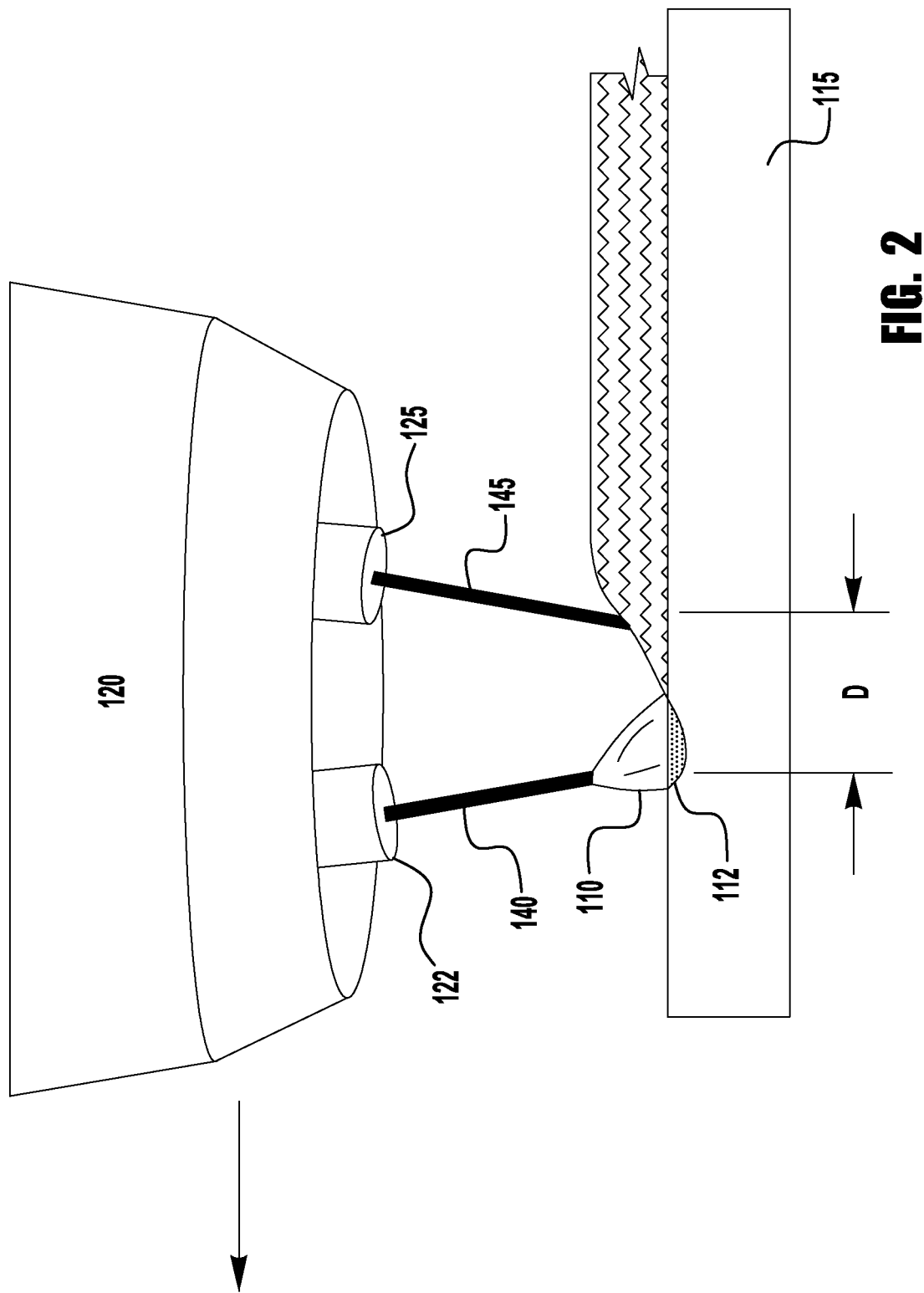
FIG. 2 is an enlarged view of the area around the torch of the system of FIG. 1.

FIG. 2 depicts a closer view of an exemplary welding operation of the present invention. As can be seen contact tubes 122 and 125 are integrated into the torch unit 120 (which can be an exemplary GMAW/MIG torch). The contact tube 122 is electrically isolated from the contact tube 125 within the torch unit 120 so as to prevent current transfer between the consumables during the process. The contact tube 122 delivers a consumable 140 to the molten puddle 112 (i.e., weld puddle) through the use of the arc 110—as is generally known. Further, the hot wire consumable 145 is delivered to the molten puddle 110 by wire feeder 155 via contact tube 125. It should be noted that although the contact tubes 120/125 are shown in a single integrated unit, these components can be separate. In some embodiments, when a laser is used to create the molten puddle 112, an arc-type high intensity energy source may not be needed. However, in hybrid laser systems, a laser and an arc-type high intensity energy source can both be used.

A sensing and current controller 195 can be used to control the operation of the power supplies 130 and 135 to, e.g., control/synchronize the respective currents. In addition, the sensing and current controller 195 can also be used to control wire feeders 150 and 155. In FIG. 1, the sensing and current controller 195 is shown external to the power supplies 130 and 135, but in some embodiments the sensing and current controller 195 can be internal to at least one of the welding power supplies 130 and 135 or to at least one of the wire feeders 150 and 155. For example, at least one of the power supplies 130 and 135 can be a master which controls the operation of the other power supplies and the wire feeders. During operation, the sensing and current controller 195 (which can be any type of CPU, welding controller, or the like) controls the output of the welding power supplies 130 and 135 and the wire feeders 150 and 155. This can be accomplished in a number of ways. For example, the sensing and current controller 195 can use real-time feedback data, e.g., arc voltage $V_1$, welding current $I_1$, heating current $I_2$, sensing voltage $V_2$, etc., from the power supplies to ensure that, e.g., the welding waveform and heating current waveform from the respective power supplies are properly synced. Further, the sensing and current controller 195 can control and receive real-time feedback data, e.g., wire feed speed, etc., from the wire feeders 150 and 155. Alternatively a master-slave relationship can also be utilized where one of the power supplies is used to control the output of the other. When a laser is used, the feedback data can include a power level of the laser, a focus setting, etc.

The control of the power supplies and wire feeders can be accomplished by a number of methodologies including the use of state tables or algorithms that control the power supplies such that their output currents are synchronized for a stable operation. For example, the sensing and current controller 195 can include a parallel state-based controller. Parallel state-based controllers are discussed in application Ser. Nos. 13/534,119 and 13/438,703, which are incorporated by reference herein in their entirety. Accordingly, parallel state-based controllers will not be further discussed in detail.

As shown in FIGS. 1 and 2, the arc 110 is positioned in the lead—relative to the travel direction. This is because the arc 110 is used to achieve the desired penetration in the workpiece(s). That is, the arc 110 is used to create the molten puddle 112 and achieve the desired penetration in the workpiece(s). Then, following behind the first arc process is the hot wire process, which heats the wire 145 to a desired temperature. As shown in FIG. 2, the hot wire 145 is inserted in the same weld puddle 112 as the arc 110, but trails behind the arc by a distance D. In some exemplary embodiments, this distance is in the range of 5 to 20 mm, and in other embodiments, this distance is in the range of 5 to 10 mm. Of course, other distances can be used so long as the wire 145 is fed into the same molten puddle 112 as that created by the leading arc 110. However, the wires 140 and 145 are to be deposited in the same molten puddle 112 and the distance D is to be such that there is minimal adverse magnetic interference with the arc 110 by the heating current used to heat the wire 145. In general, the size of the puddle 112—into which the arc 110 and the wire 145 are collectively directed—will depend on the welding speed, arc parameters, total power to the wire 145, material type, etc., which will also be factors in determining a desired distance between wires 140 and 145.

The addition of the wire 145 adds more consumable to the puddle 112 without the additional heat input of another welding arc, such as in a traditional tandem MIG process in which at least two arcs are used. In some embodiments, as discussed further below, the hot wire heating process includes introducing "micro-arcs" of limited duration. A micro-arc is an electric arc that forms when a resistively heated wire is heated above a point at which the connection melts forming an arc of minimal plasma length. Left alone, the arc produces significantly more heat and grows quickly to a full arcing condition. As shown in FIG. 7, the current through wire 145 is not enough to melt wire 145 at 702 and the wire 145 is in contact with workpiece 115 with no arc formation. When the current is increased, the current will start to melt the wire 145 as shown in 704. At this time, the wire 145 is still in contact with the workpiece 115 and there is still no arc formation. If the current is increased further, the tip of hot-wire 145 melts and breaks contact with workpiece 115 to form an arc as shown in 706. Because the arc is still in its initial stage at 706, it is considered a micro-arc (see 712). If the arc is not extinguished, the arc will then grow into a full arc 714 as shown in 708 and 710 and the transition to a full arc 714 from a micro-arc 712 can happen very quickly. However, if the output of the hot-wire power supply 135 is turned off (or reduced) fast enough, all the user sees is the micro-arc. In some embodiments of the present invention, during hot wire operation, the arc is contained to the micro-arc stage 712 by shutting off or reducing the heating current, which then allows the wire 145 to push back into the puddle 112 before the arc reaches the full arc stage 714 and the additional heat of the arc overheats the weld zone. In exemplary embodiments of the present invention, the duration, amplitude, and/or frequency of the micro arcs can be used to add heat to the weld puddle 112, improve the bead shape, increase the penetration, and/or agitate or stir the weld puddle 112 as desired. Embodiments of the present invention can achieve significant deposition rates at considerably less heat input than known tandem MIG welding methods.

For example, at least two consumables 140/145 are used in the same puddle 112 in some exemplary systems, e.g., GMAW, FCAW, MCAW, SAW, etc. In these exemplary embodiments, a very high deposition rate can be achieved, with a heat input decrease of up to 35% based on a comparable tandem system during most welding modes of operation. This provides significant advantages over full-time tandem MIG welding systems which have very high heat input into the workpiece. For example, such embodiments can easily achieve at least 23 lb/hr deposition rate with the heat input of a single arc and a hot wire. Other exemplary embodiments have a deposition rate of at least 35 lb/hr.

In exemplary embodiments of the present invention that use at least two consumables, each of the consumables (e.g., wires 140 and 145) can be the same, in that they have the same composition, diameter, etc. However, in other exemplary embodiments these wires can be different. For example, the wires can have different diameters, wire feed speeds and composition as desired for the particular operation. In some exemplary embodiments the wire feed speed for the lead wire 140 can be different than that for the hot wire 145. For example, the lead wire 140 can have a wire feed speed of 450 ipm, while the trail wire 145 has a wire feed speed of 400 ipm. Further, the wires can have different sizes and compositions.

In addition, because wires of different chemistries can be used, a weld joint can be created having different layers, which is traditionally achieved by two separate passes. The lead wire 140 can have the required chemistry needed for a traditional first pass, while the trail wire 145 can have the chemistry needed for a traditional second pass. Further, in some embodiments at least one of the wires 140/145 can be a cored wire. For example, the hot wire 145 can be a cored wire having a powder core which deposits a desired material into the weld puddle.

Figure 3:
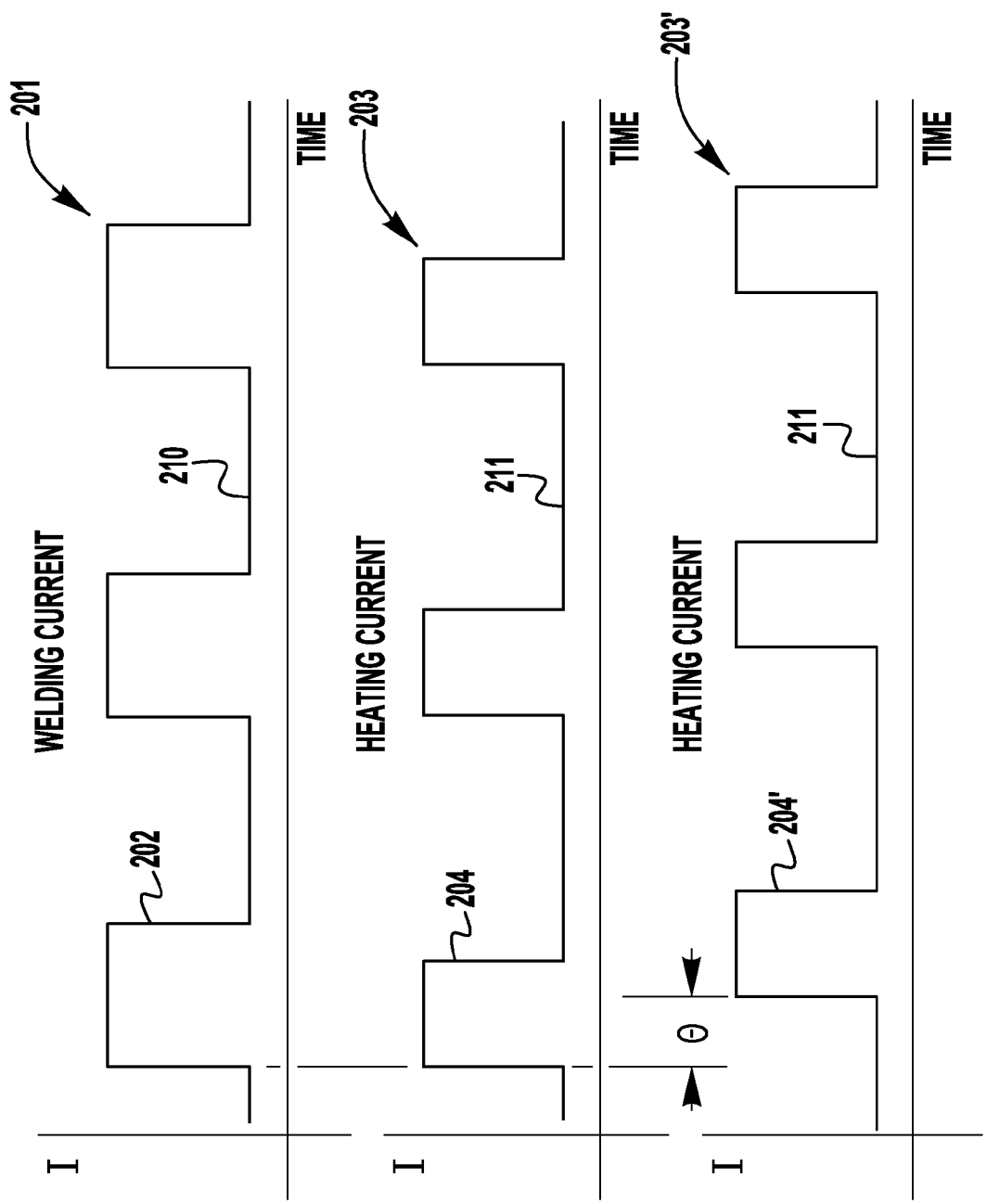
FIG. 3 illustrates an exemplary welding waveform and exemplary hot wire waveforms that can be used in the system of FIG. 1.

FIG. 3 depicts exemplary current waveforms for the arc welding current and the hot wire heating current that can be output from power supplies 130 and 135, respectively. For example, the exemplary arc welding waveform 201, e.g., a GMAW welding waveform, can be output from power supply 130. The welding waveform 201 uses current pulses 202 to aid in the transfer of droplets from the wire 140 to the puddle 112 via the arc 110. The current pulses 202 are separated by background levels 210 of a lesser current level than the pulses 202. The arc welding waveform 201 shown in FIG. 3 is exemplary and representative and not intended to be limiting. For example, the arc welding waveform can be that used for pulsed spray transfer, pulse welding, short arc transfer, surface tension transfer (STT) welding, shorted retract welding, constant current (or near constant current), constant voltage, etc. In addition, the arc welding waveform can be an AC waveform. Of course, with TIG and PAW systems, the electrode is not a consumable and is not transferred to the puddle as in, e.g., a GMAW process. Also, with a laser, instead of a welding waveform, the intensity of the laser can be controlled and coordinated with the hot wire waveform.

The hot-wire current waveform used to heat the wire 145 is not limiting and can be a steady-state current (e.g., for use in laser hot-wire systems), a pulsed DC current (e.g., for use in hot-wire tandem systems), variable polarity current (e.g., for TIG and SAW systems), etc. For example, as illustrated in FIG. 3, the hot wire power supply 135 can output a heating current waveform 203 which can have a series of pulses 204 that are separated by a background current 211 of a lesser current level to heat the wire 145 through resistance heating. The peak value of the pulses 204 and/or the background current 211 can be adjusted as desired based on, e.g., wire type and diameter, welding process type (e.g., cladding, joining, building up, etc), type of high intensity heat source, wire feed speed, desired wire temperature, etc. In some embodiments, as shown in FIG. 3 the pulses 202 and 204 from the respective current waveforms can be synchronized such that they are in phase with each other, i.e., a phase angle $\Theta$ of zero. In many hot-wire tandem systems, a zero phase angle, i.e., no offset, is desirable when it comes to arc stability. However, in other embodiments, an offset can be desirable. For example, the pulses 202 and 204 can be shifted by any desired phase angle in order to achieve the desired stability for the arc 110 or for some other reason (see pulse 204' of waveform 203'). For example, depending on the type of high intensity heat source, the type of welding waveform, other welding parameters, arc stability, etc., the phase angle $\Theta$ can be in the range of 30 to 270 degrees in some embodiments. Of course, other phase angles can be used depending on the system. Further still, in some embodiments, the pulses 202 and 204 (204') are not synchronized. For example, the welding current 201 and the heating current 203 (203') can be controlled independently of each other.

In the exemplary embodiment illustrated in FIG. 3, the current waveforms are controlled such that the current pulses 202/204(204') have a similar, or the same, frequency. In some embodiments, if the arc welding current frequency changes, the heating current frequency can change accordingly. Similarly, in some embodiments, if the arc welding frequency can be set up to follow the heating current frequency if desired. However, the frequencies of the welding waveform and the hot wire waveform need not be the same. In some embodiments, the frequencies are different. For example, in some embodiments, the welding waveform can have a higher frequency than the heating waveform frequency, and in some embodiments, the heating waveform frequency is higher. In addition, the heating waveforms 203, 203' in FIG. 3 are illustrated as Pulsed DC waveforms. However, the present invention is not so limited, and other types of heating waveforms can be used such as, e.g., steady state DC, variable polarity, AC waveforms, etc.

In the exemplary embodiments discussed above, the combination of the arc 110 and the hot-wire 145 can be used to balance the heat input to the weld deposit, consistent with the requirements and limitations of the specific operation to be performed. For example, in some embodiments, the arc 110 provides the heat to, e.g., obtain the penetration to join workpieces, and the hot wire 145 is primarily used, e.g., for fill of the joint. The heat from the resistive heating of hot wire 145 helps in that the hot wire 145 will not quench the puddle 112, adds filler without removing heat, and/or does not prematurely cool the puddle 112. In some cases, additional heat input is desirable to improve bead shape, increase penetration, and/or increase stirring action within the weld puddle 112. In such cases, in exemplary embodiments of the present invention, the current through hot wire 145 can be ramped until the contact between the wire 145 and the puddle 112 melts completely and an arc forms in order to provide additional heat input to aid in the penetration and/or to provide agitation for the weld puddle 112. The arc is controlled such that it is of limited intensity and duration, i.e., the arc is limited to a micro-arc stage—see 712 in FIG. 7). In some embodiments, the hot-wire current is increased such that it is 1% to 10% above the average current needed to form the micro-arc.

Figure 4:
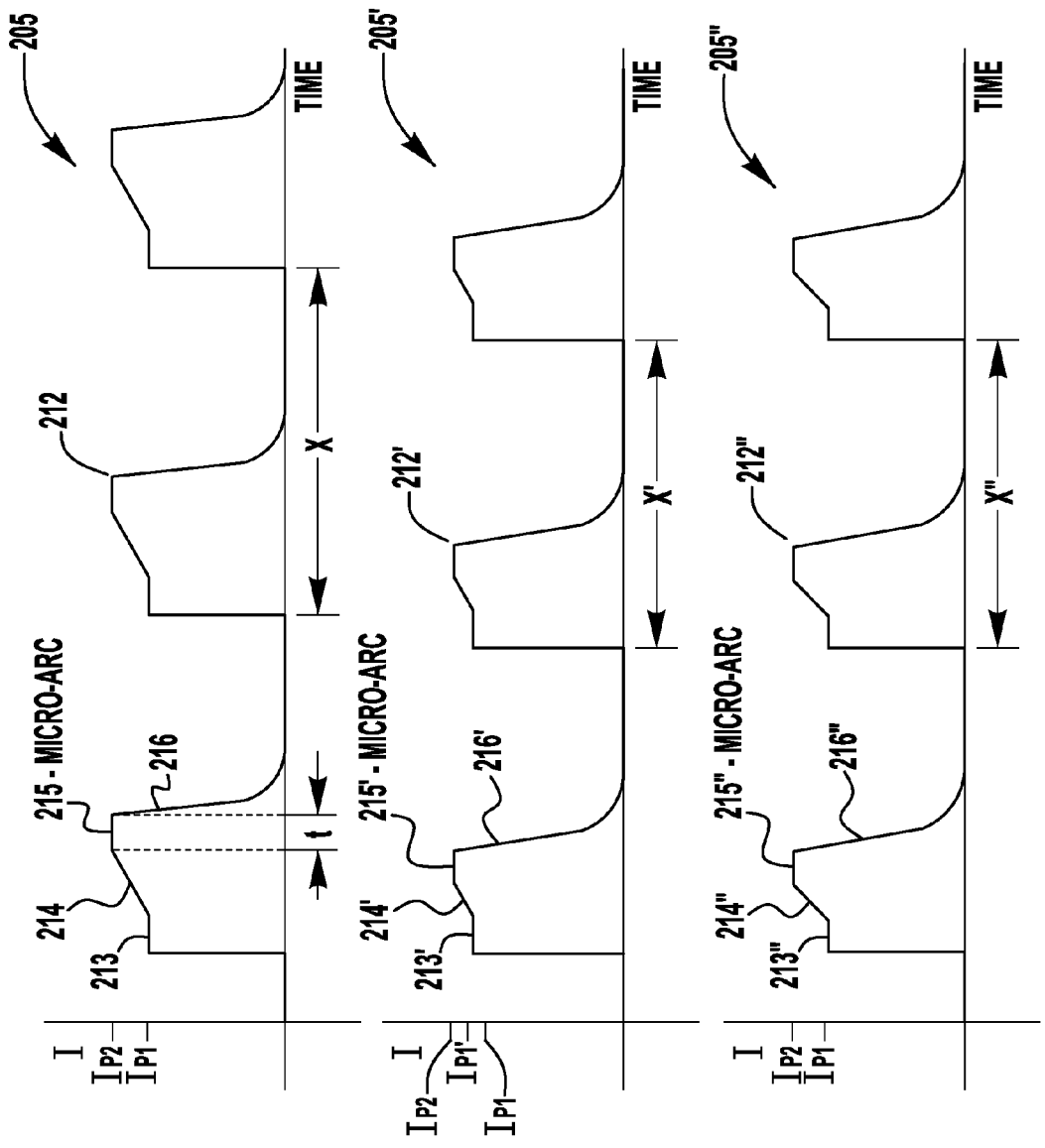
FIG. 4 illustrates exemplary hot-wire waveforms that can be used in the system of FIG. 1.

In some exemplary embodiments, when micro-arcs are desired, the exemplary heating waveform 205 of FIG. 4 can be output from power supply 135. The heating waveform 205 includes heating pulses 212 that are separated by background levels 220 of zero amps. The heating pulses 212 can have a first segment 213 and a ramp down segment 216. In addition, one or more of the heating pulses 212 can have a ramp segment 214 and a second segment 215. The first segment 213 has a value $I_{P1}$ that can be predetermined and set such that the wire 145 is heated to a desired temperature, e.g., to at or near its melting temperature, without causing an arc to form between wire 145 and workpiece 115. The value $I_{P1}$ can be manually set or automatically determined based on factors such as wire type and diameter, welding process type (e.g., cladding, joining, building up, etc), type of high intensity heat source, wire feed speed, desired wire temperature, etc. In addition, the value $I_{P1}$ can be automatically adjusted during the welding process based on the welding conditions. For example, the value $I_{P1}$ can be decreased if the wire 145 is arcing when not desired or increased if the wire 145 is not heating to the desired temperature. It should be noted that, at this point, pulse 212 of waveform 205 is similar to pulse 204 (204') of waveform 203 (203') in that, at a heating current value of $I_{P1}$, the wire 145 is heated to a desired temperature and there is no arcing.

However, one or more of the pulses 212 of waveform 205 can also include a ramp segment 214 that ramps the current value from the segment 213 having the value $I_{P1}$ to a segment 215 having a value of $I_{P2}$. The ramp rate of segment 214 can be user settable or automatically determined by controller 195 (or some other device). The value $I_{P2}$ of the segment 215 can be predetermined and set such that the wire 145 just starts to arc. In other embodiments, the value $I_{P2}$ is not predetermined and the heating current value is ramped up from the value $I_{P1}$ until, e.g., the controller 195 detects an arcing condition on wire 145. For example, feedback voltage $V_2$ of power supply 135 will be low, e.g., in a range of 1 to 12 volts, when the wire 145 is shorted to the workpiece 115 and in a range of, e.g., 13 to 40 volts when the wire 145 is in an arcing condition. Once arcing is detected in wire 145, the output current from power supply 135 stops increasing and, after a desired duration, the power supply 135 is turned off (or the output of power supply 135 is dropped to a level where the arc is not sustainable). Accordingly, segment 215 is designed to form an arc that is of a short length and duration, i.e., a micro-arc. Such a micro-arc can provide additional heat input to the weld puddle 112 as desired. For example, if it is desirable to increase the heat input to the weld puddle 112 but increasing the arc welding current (or intensity of the laser) is not desirable and/or feasible, the heating current through wire 145 can be increased, i.e., ramping from segment 213 to segment 215, such that micro-arcs are formed. The micro-arcs can provide additional heat input to aid in, e.g., situations where a single arc (or laser and hot wire) does not provide enough heat input (e.g., at a sidewall of a joint or at an edge of a cladding layer), but having two full arcs (or a laser and an arc) would provide too much heat input (e.g., when trying to bridge a gap in a joint, when welding on a thin plate, or when admixture must be minimized in a cladding operation). When a weld pass goes near a sidewall of a joint or an edge of previous cladding layer, a little additional heat input may provide better penetration and thus, better fusion of the base metal to the weld metal. Accordingly, the micro-arcs can be controlled as desired to "fine tune" the heat input to weld puddle 112. In some embodiments, the point at which the output current from power supply 135 stops increasing after detection of the micro-arc can be controlled in order to achieve the desired heat increase from the micro-arc. For example, in some embodiments, the increase in the output current from power supply 135 can be stopped immediately after the arcing condition is detected. In other embodiments, the increase in current can be stopped after a desired delay in order to ensure that the system remains in a micro-arc condition during a desired time period (or for some other reason). In still other embodiments, the increase in current after detecting a micro-arc condition can be stopped after the current reaches a desired current level in order to ensure the desired heat input has been achieved (or for some other reason).

In addition, in some embodiments, the micro-arcs can serve to agitate (or further agitate or stir the weld puddle 112) the weld puddle 112. For example, in embodiments where a laser, instead of an arc, is used as the high intensity energy source, it may be desirable to agitate the molten puddle 112, as the laser beam may not provide sufficient mixing of the base molten metal and the melted filler wire 145. Of course, the micro-arcs can provide additional agitation even in arc-type systems when desired.

In some exemplary embodiments of the present invention, the sensing and current controller 195 (or some other device) can control the duration of the micro-arcs as desired to provide additional heat input and/or agitation to the weld puddle 112. That is, once formed, each micro-arc can be controlled for a predetermined duration t (see 215 of FIG. 4), where t can be in a range from, e.g., 50 microseconds to 2 milliseconds, or some other range that provides the desired heat input and/or agitation. In some embodiments, the duration t can be set to about 300 microseconds.

Figure 5:
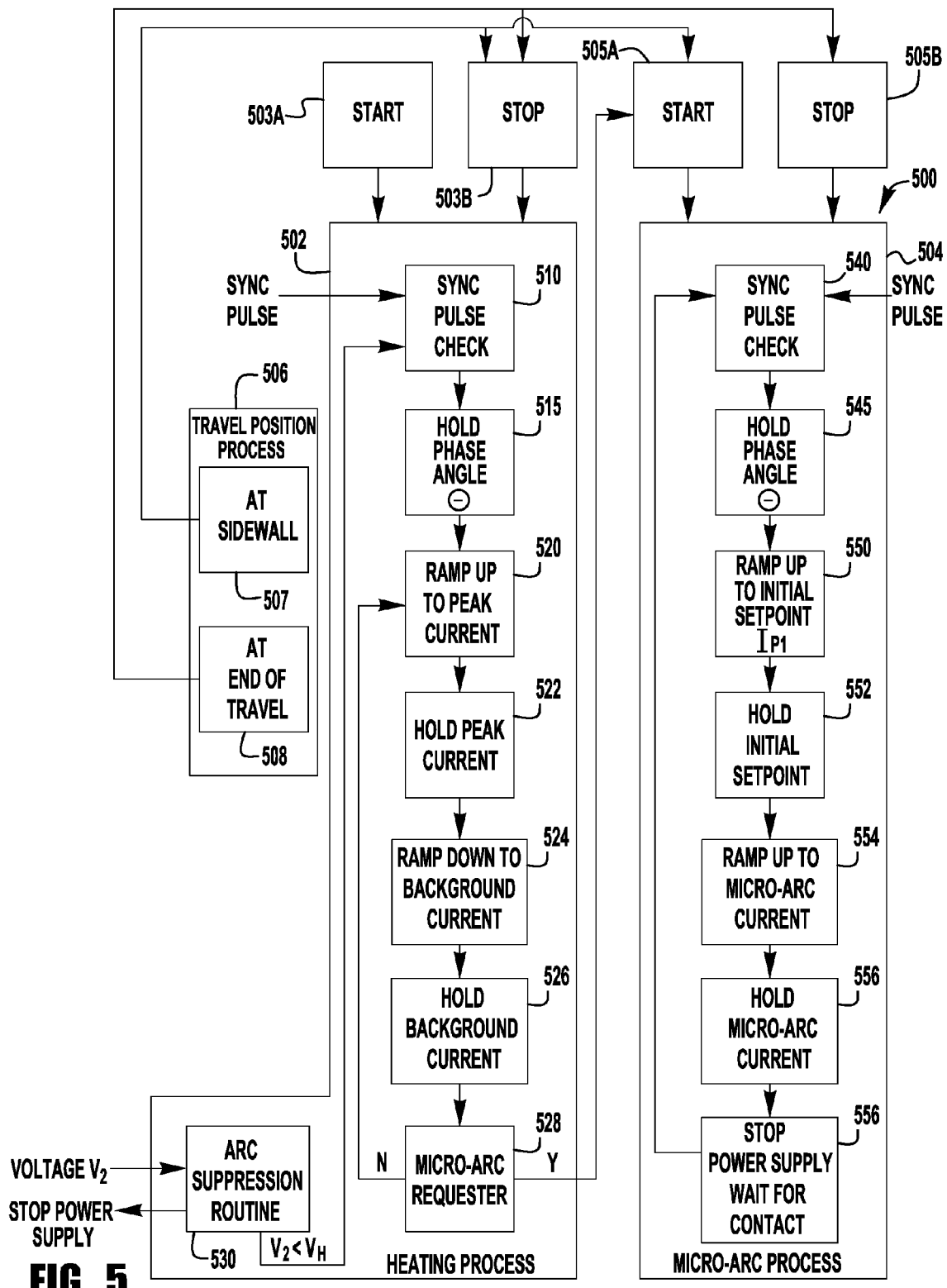
FIG. 5 illustrates a block diagram of an exemplary program that can be executed by the controller in the system of FIG. 1.

FIG. 5 illustrates an exemplary program 500 that can be implemented by the sensing and current controller 195 (or some other device) to control the power supply 135 such that the wire 145 starts to micro-arc when desired. Program 500 can switch between a heating process 502, which can, e.g., implement waveform 203 (203'), and a micro-arc process 504, which can, e.g., implement waveform 205. Of course, while the labels "heating process" and "micro-arc process" are used to distinguish between the two processes, it is understood that the micro-arc process 205 will also heat the wire 145. In an exemplary welding process, if a heating process 502 is desired initially, the controller 195 will start the heating process 502 at step 503A. Once the heating process 502 has started, the arc suppression monitor routine 530, which monitors the voltage $V_2$ (see FIG. 1), is started. The arc suppression monitor routine 530 monitors for an arcing condition and turns off the power supply 135 if the wire 145 starts to arc when it is not supposed to, e.g., when the micro-arc process 504 has not been requested to start. When shorted, the voltage $V_2$ of the wire 145 is in a range of 1 to 12 volts because the system does not include the cathode/anode drop. In contrast, during an arcing condition, the voltage $V_2$ of the power supply 135 can be in a range of 13 to 40 volts. Thus, a voltage of 13 volts or more can mean that the wire 145 is not shorted and an arcing condition exists between wire 145 and workpiece 115. Accordingly, based on a predetermined voltage $V_H$, which can be set at, e.g., 13 volts or higher, the arc suppression routine 530 will determine whether to stop the power supply 135 and let the wire 145 short to the weld puddle 112 or continue the heating process 502. For example, if the voltage $V_2$ is greater than or equal to 13 volts, the power supply 135 is stopped until the wire 145 has shorted to puddle 112 based on, e.g., a timer or a sensing mechanism such as, e.g., a torque sensor in wire feeder 155 or some other sensing device. By turning off the power supply 135, the current through the wire 145 will stop and the wire 145 will advance until it shorts to the workpiece 115. Of course $V_H$ is not limited to 13 volts and other values for $V_H$ can be used based on the system and/or process. Once the wire 145 is shorted and voltage $V_2$ is below voltage $V_H$, the heating process 502 can be started (see step 510 of the heating process 502) so that the heating current from power supply 135 can be controlled to, e.g., maintain a desired temperature in the wire 145. However, even after the heating process 502 has been started, the arc suppression routine 530 continuously monitors the voltage $V_2$ and stops the power supply 135 to suppress the arc on the wire 145 if the voltage $V_2$ is above $V_H$.

At step 510, the controller 195 waits for the synchronization signal indicating that the power supply 130 has initiated an arc welding current peak pulse, e.g., the rising edge of pulse 202. Of course, another portion of the arc welding current waveform 201 can be used for synchronization purposes such as, e.g., the falling edge of the peak pulse, etc. Once the synchronization signal has been received, the controller 195 waits an appropriate time based on the desired phase angle Θ (step 515) before initiating a heating current pulse at step 520. The heating current pulse can be, e.g., pulse 204 or 204' as shown in FIG. 3. In some embodiments, based on the type of welding and heating current waveforms, the synchronization signal may not be needed.

After holding the peak heating current level for a predetermined period of time at step 522, the heating current from power supply 135 is ramped down to a background current level at step 524. At step 526, the background heating current level is held for a predetermined period of time before the controller 195 goes to step 528. At step 528, the controller 195 checks to see if the micro-arc welding process 504 should be initiated. If no, the controller 195 goes to step 520 and a new heating current cycle is started. The heating process 502 continues until the process is stopped at step 503B, e.g., because the torch unit 120 has reached the end of travel, the operator has manually stopped the process, etc.

If the micro-arc process 504 has been requested at step 528, the controller proceeds to step 505A where the micro-arc process 504 is started. Of course, similar to the arc suppression monitor routine 530, the check for whether the micro-arc process should be started can be done continuously (e.g., in the background). If the micro-arc request check is run continuously, the switch to the micro-arc process 504 can be done at any desired time, rather than at just step 528.

Once the micro-arc heating process 504 has started, the controller 195 will go to step 540 and check for the synchronization pulse that indicates that the power supply 130 has initiated an arc welding current peak pulse, e.g., the rising edge of pulse 202 (see FIG. 3). Of course, as with the normal heating process 502, another portion of the arc welding current waveform of power supply 130 can be used for synchronization purposes such as, e.g., the falling edge of the pulse, etc. Once the synchronization signal is received, the controller 195 goes to step 545 and waits an appropriate time based on the desired phase angle Θ before initiating an arc welding current pulse from power supply 135 at step 550. Again, in some embodiments, based on the type of arc welding and heating current waveforms, the synchronization signal may not be needed. At step 550, the current from power supply 135 is ramped up to match an initial setpoint. For example, the initial setpoint can correspond to a current value $I_{P1}$. As discussed above, the value $I_{P1}$ can be, e.g., a current value that is just under an arcing condition for the wire 145. The value $I_{P1}$ can be higher, lower, or the same value as that of pulse 204 or 204' depending on the welding conditions and the desired average heating current value.

After holding the initial setpoint for a predetermined period of time at step 554, the micro-arc welding current from power supply 135 is ramped up at a predetermined rate to a current value (e.g., $I_{P2}$) that just starts to create an arc (see 214, 215 in FIG. 4). In some embodiments, the value $I_{P2}$ is predetermined based on the wire type, wire speed, welding conditions, etc. In other embodiments, the current is ramped until the controller 195 determines when the arcing condition has started based on, e.g., the voltage $V_2$. For example, an arcing condition can exist if the voltage $V_2$ is at or above, e.g., 13 volts, and micro-arcs can exist in a range from 13 volts to 40 volts. Thus, the current can be ramped until there is a spike in voltage $V_2$, e.g., in a range from 13 volts to 40 volts. By controlling the current through wire 145 to a point where the wire 145 reaches its melting point, breaks connection to the puddle 112, and forms a micro arc, the heat input of the micro-arc current is above that of the normal heating current (e.g., heating current waveform 203 of FIG. 3). The heat input of the micro-arc current can then be controlled by controlling the duration, amplitude, and/or frequency of the micro-arcs. In the exemplary embodiment of FIG. 5, at step 556, the micro-arc current, e.g., $I_{P2}$, is held for a predetermined duration t, e.g., between 50 microseconds to 2 milliseconds. In some embodiments, the duration t is fixed at a desired value for the entire welding process. In other embodiments, the duration t can be changed either manually or automatically during the welding process in order achieve the desired heat input and/or agitation. For example, based on a feedback signal, e.g., weld temperature, the controller 195 can adjust the duration t to achieve the desired weld temperature. After the duration t has elapsed, the power supply 135 is shut down at step 558 so that the arc extinguishes and the wire 145 makes contact with the puddle 112 again. The determination of whether the wire 145 has shorted to puddle 112 can be based on, e.g., a timer or a sensing mechanism such as, e.g., a torque sensor in wire feeder 155 or some other sensing device. After the wire 145 makes contact with the puddle 112 again, the controller goes to step 540 and the micro-arc cycle begins again. In some embodiments, rather than shutting off the power supply 135, the output is reduced such that the micro-arc is not sustainable.

It should be noted that, when the power supply 135 is shut down (or the output appropriately reduced) at step 558, the rate at which the current from power supply 135 ramps down to zero depends on the inductance in the hot wire system. As discussed further below, in some embodiments, the ramp down rate can be accelerated by using an induction current suppression circuit. Once the micro-arc is extinguished, no current flows through the wire 145 until the wire 145 once again makes contact with the workpiece 115 and the output current from power supply 135 starts to flow again. This "dead time," i.e., the period when no current flows or a reduced current flows through the wire 145, can be fixed in some exemplary embodiments. In other embodiments, the "dead time" can be controlled to adjust the heat input to the weld puddle 112 and/or the agitation of the weld puddle 112. For example, the "dead time" can be adjusted as desired by changing the wire feed speed of feeder 155 and/or controlling when the power supply is turned on again (in embodiments where the power supply is turned off).

In some embodiments, depending on the wire feed speed and the gap between the tip of wire 145 and the surface of the workpiece 115, the time for the wire 145 to once again make contact with the workpiece 115 after the arc has been extinguished can be up to 10 millisecond or longer, but is typically between 300 microseconds to 500 microseconds in some embodiments. Once the wire 145 has shorted to the workpiece 115 again, the controller 195 goes to step 540 and the micro-arc process 504 starts again. The micro-arc process 504 continues until it is stopped at step 505B, e.g., because the torch unit 120 reached the end of travel, the operator manually stopped the process, the extra heat input of the micro-arc is no longer desired, the agitation of the weld puddle 112 is no longer desired, and/or for some other reason. For example, if the welding process is at the end of travel, a signal from program 508 can stop both the heating process 502 and the micro-arc process 504 at steps 503B and 505B, respectively.

Figure 8:
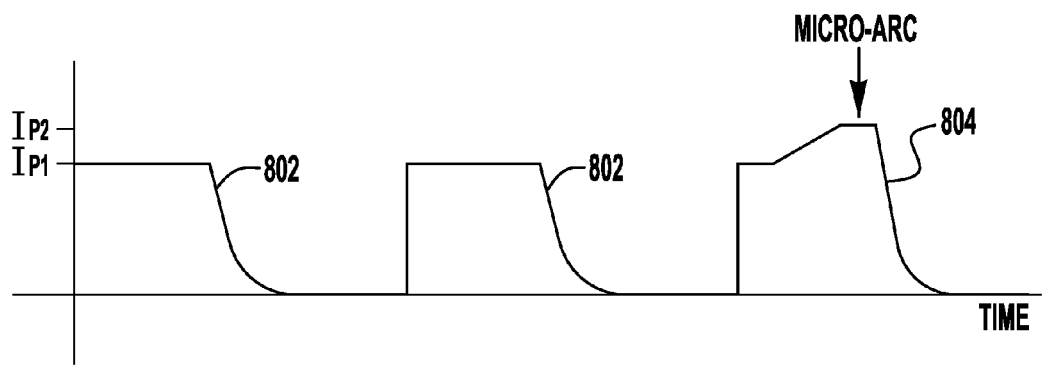
FIG. 8 illustrates an exemplary heating current waveform that is consistent with the present invention.

In the above embodiments with respect to micro-arc process 504, the micro-arcs are controlled such that they occur at every pulse, e.g., every pulse 212 of waveform 205. However, the micro-arcs can be controlled such that they occur every n pulses—where n is positive integer. That is, micro-arc pulses such as, e.g., pulse 212, can be mixed with non-micro-arc pulses such as, e.g., pulse 204 or 204'. For example, FIG. 8 illustrates a heating waveform 800 in which a pulse 804 is initiated after every two pulses 802. Pulse 804 can, e.g., be similar to pulse 212, 212', or 212" of FIG. 4 and can be controlled to create a micro-arc, e.g., as discussed in the above exemplary embodiments. Pulses 802 can, e.g., be similar to pulses 204 or 204' of FIG. 3 and are set to a value, e.g., $I_{P1}$, such that the wire 145 does not enter an arcing condition. Of course, appropriate changes to the program 500 would have to be made in order to implement the waveform 800.

Figure 9:
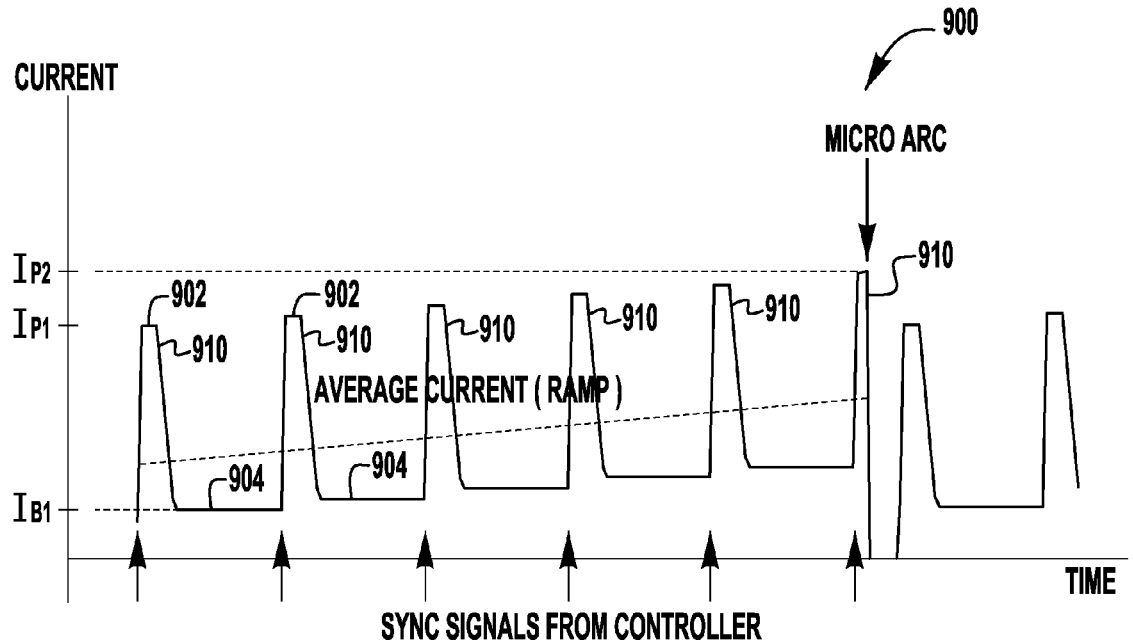
FIG. 9 illustrates an exemplary heating current waveform that is consistent with the present invention.

In some embodiments, the pulse current value either alone or in combination with the background heating current value can be ramped up over a plurality of heating current pulses until a micro-arc is detected. For example, FIG. 9 illustrates an exemplary heating waveform 900 with pulses 910 that have a pulse current value 902 and background heating current 904. The pulse current value 902 and the background current value 904 can be controlled by, e.g., controlled 195, to a predetermined a pulse current setpoint and a predetermined background current setpoint. The pulse current setpoint and background current setpoint can initially be set such that wire 145 remains in contact with the weld puddle 112 and no micro-arcs are formed (see 702 of FIG. 7). As shown in FIG. 9, the pulse current setpoint is set initially to a value corresponding to current value $I_{P1}$ and the background current setpoint is set initially to a value corresponding to a current value $I_{B1}$. In some embodiments, the pulse current setpoint and/or the background heating current setpoint can be ramped up over successive heating pulses 910 such that the average current increases and pulses 902 create a micro-arc. For example, as illustrated in FIG. 9, successive pulse currents 902 and background currents 904 increase in value until a micro-arc is formed. In the embodiment shown in FIG. 9, both the pulse current 902 and background current 904 are increased. However, in some embodiments, only the pulse current 902 or only the background current 904 of pulses 910 can be increased so long as the heat input to the wire 145 is increased. The pulses 910 from the power supply 135 can be set to a sync signal sent by controller 195 (or a similar device). The sync signal signals from the controller 195 can be coordinated with the arc welding system as discussed above. Once a micro-arc is detected, the duration of the micro-arc can be controlled as discussed above and then the power supply 135 can be turned off or reduced in power such that the wire 145 once again makes contact with the weld puddle 112. After the desired "dead time," the pulses 910 resume again starting at the initial setpoint, e.g., $I_{P1}$, and the initial background current value, e.g., $I_{B1}$.

In some embodiments, the controller 195 can implement the micro-arc processes as discussed above (or other micro-arc processes consistent with the present invention) during the entire welding process rather than switch between a heating process and a micro-arc process (e.g., switching between the heating process 502 and the micro-arc process 504). In other embodiments, the micro-arcs can be controlled to occur only at desired locations where additional heat input and/or agitation is desired, e.g., when the torch 120 is near a sidewall of the weld joint or a previous cladding layer.

For example, in a welding process where the torch 120 weaves from one sidewall of a joint to another, the system 100 can be configured such that the micro-arcs are initiated manually or automatically by, e.g., the sensing and current controller 195 (or some other device) whenever the torch 120 is at a sidewall. As shown in FIG. 5, travel position process 506 can include a program 507 that sends "at sidewall" signal that stops the normal heating process 502 and starts the micro-arc heating process 504 when the torch 120 is at a sidewall in order to, e.g., provide additional heat input and/or agitation. When the torch 120 is away from the side wall, the "at sidewall" signal is removed and the controller 195 can restart the normal heating current process 502 at step 503A, if desired. In some embodiments, the robot 190 (see FIG. 1) or a mechanical oscillator (not shown) can produce the weave pattern by oscillating torch 120 from one sidewall to another and also provide the sidewall position signal. Of course, other methods that indicate the proximity of torch unit 120 to a sidewall can be used to start/stop the micro-arc heating process 504 and/or the normal heating process 502. For example, a signal based on the arc voltage $V_1$ can be used to indicate when the torch unit 120 is near a sidewall of the weld joint. In still other embodiments, the processes 502 and 504 can be switched based on a predetermined time period or on a predetermined cycle count, e.g., the number of heating pulses/micro-arcs. Of course, similar to the "at sidewall" signal, the system 100 can also be configured such that the micro-arc process 504 is initiated when the torch 120 is near a previous cladding layer in a multi-pass cladding process. In some embodiments, the robot 190 can also provide the end of travel signal to travel position process 506.

In the above embodiments, the processes 502 and 504 are DC, but the present invention is not so limited and variable polarity currents can be used with the appropriate modifications to the program steps of program 500. For example, variable polarity currents can be used in applications requiring minimal interaction between the arc and the hot wire. In addition, the processes can also use steady state DC hot wire, a steady state slow ramp waveform, etc. Further, the exemplary embodiments discussed above use pulse type waveforms for the arc welding waveform, heating process 502, and the micro-arc process 504. However, the present invention can use other types of waveforms. For example, the waveforms can be sinusoidal, triangular, soft-square wave, modified versions thereof, etc. Also, in the embodiments discussed above, the heating waveform (e.g., 204 or 204') and micro-arc waveform (e.g., 205) stayed the same during the welding process. However, in some embodiments of present invention, the waveform shape or type, amplitude, zero offset, pulse widths, phase angles, or other parameters of the waveforms can be changed as desired to control heat input.

As discussed above, some exemplary embodiments, the duration t of the arcing period can be adjusted to control the heat input to the weld puddle 112. Alternatively, or in addition to, in some exemplary embodiments, the frequency at which the micro-arcs occur can be controlled as desired to adjust the heat input to the weld puddle 112 and/or agitation of the weld puddle 112. For example, the initial setpoint and/or ramp rate from the initial setpoint to an arcing condition can be adjusted as needed to achieve the desired frequency and thus, the desired heat input and/or agitation. FIG. 4 illustrates the changes in the frequency of the welding waveform 205 when the initial setpoint is increased (see waveform 205') and when the ramp rate is increased (see waveform 205"). Waveform 205 has pulses 212 that are initially ramped to a value $I_{P1}$, as discussed above. From the value of $I_{P1}$, the current is ramped at a predetermined rate until a micro-arc forms (see 214, 215), as discussed above. Once the controller 195 (or some other device) detects that wire 145 is in a micro-arc condition, e.g., by monitoring the voltage $V_2$, the power supply 135 is shut off after a duration t and the current ramps down to zero (see 216). After the power supply 135 is shut down, the wire 145 will once again make contact with the weld puddle 112. After the current goes to zero, the power supply 135 is turned back on and ramped up to initiate the next pulse 212. So long as the welding conditions remain fairly stable, the current value at which the micro-arcs start will be approximately the same, and thus, the period x between pulses 212, will be relatively constant, i.e., the frequency of waveform 205 will be relatively stable.

In some exemplary embodiments, to change the heat input to the weld puddle 112, the frequency of the micro-arcs can be changed by either changing the initial setpoint or the ramp rate. For example, as seen in waveform 205', the initial setpoint is increased from a value corresponding to $I_{P1}$ to a value corresponding to $I_{P1}{'}$ (see 203'). If the ramp rate (see 214') is kept the same as 214 in waveform 205, the time to ramp from $I_{P1}{'}$ to an arcing condition (see 215') in waveform 205' will be shorter than the time to ramp from $I_{P1}$ to an arcing condition in waveform 205. Accordingly, the period x' will be shorter than period x and the frequency of the waveform 205' will be higher than that of waveform 205, assuming the ramp rate, micro-arc duration t, and the off time between pulses are kept the same. Similarly, as seen in waveform 205", if the ramp rate (214") is increased while keeping the initial setpoint the same as waveform 205 (see 213 and 213"), the time to ramp from $I_{P1}$ to an arcing condition (see 215") will decrease and the period x" will be shorter then the period x. Thus, the frequency of waveform 205" will be higher than waveform 205, assuming the initial setpoint, micro-arc duration t, and the off time between pulses are kept the same.

As seen in FIG. 4, the ratio of the micro-arc segment (215, 215', 215") to the remaining portion of the respective waveforms has increased in each of waveforms 205' and 205" as compared to waveform 205. Accordingly, the average current will also increased from that of waveform 205. Thus, by increasing the frequency, e.g., by changing the initial setpoint and/or the ramp rate, the heat input to the weld puddle 112 will increase. In addition, because the frequency of the micro-arcs will increase, the agitation of the weld puddle 112 with also increase. Similarly, the micro-arc frequency and heat input can be decreased by lowering the initial setpoint and/or decreasing the ramp rate. Thus, by changing the frequency between micro-arcs, the heat input to the molten puddle 112 can be changed as desired while still keeping the benefits of the micro-arc process such as, e.g., providing agitation to the weld puddle 112 and/or additional penetration. In some embodiments, the frequency control, as discussed above, can be used in combination with other methods to control the heat input and/or agitation. For example, frequency control can be used in combination with controlling the micro-arc duration t in order to control the heat input to the weld puddle 112. Of course, only the frequency or only the duration t can be controlled as desired to change the heat input and/or agitation.

As discussed above, the ramp down rate (see 216, 216', 216" of FIG. 4) of the current after the power supply 135 is shut down will depend on the inductance present in the power supply, welding cables and workpiece. The higher the inductance, the slower the ramp down rate will be. In some applications, it may be necessary to force the current to decay at a faster rate. A faster current reduction can mean achieving better control over, e.g., the joining application, because a faster transition to zero current (or a low current) will result in a more defined peak and background currents. In addition, a faster reduction of the current when an arc forms will minimize the adverse affects of the arc, e.g., too much heat input and/or puddle agitation.

Figure 6A:
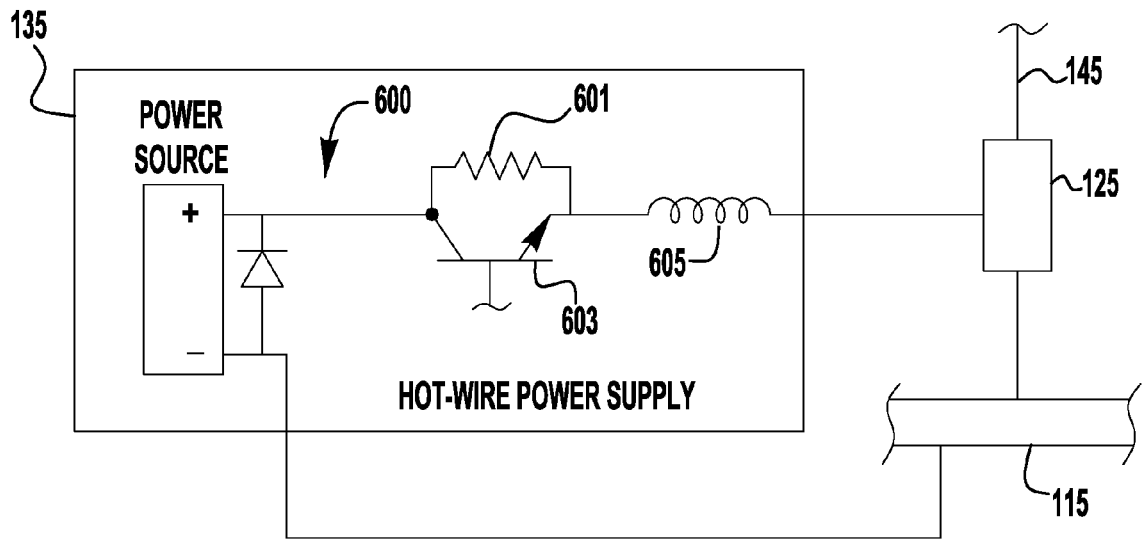
FIG. 6A illustrates a schematic diagram of an exemplary induced current suppression circuit that can be used in the system of FIG. 1.
Figure 6B:
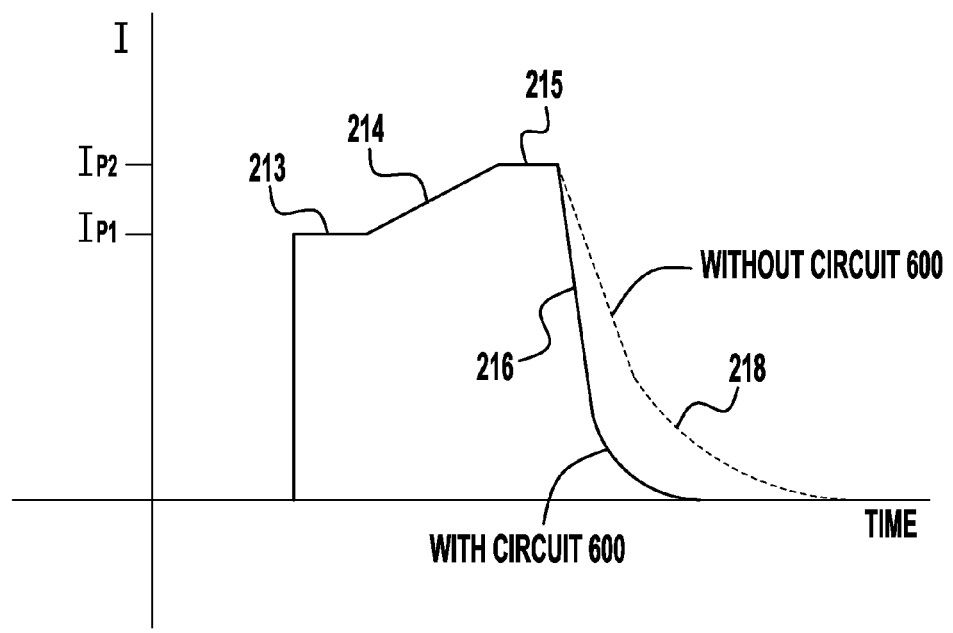
FIG. 6B illustrates differences in the ramp down times based on whether the suppression circuit of FIG. 6A is used or not.

The ramp down time for the output current of power supply 135 after it is shut off can be in a range of 200 microseconds to 500 microseconds depending on the hot wire current and the inherent inductance in the hot wire circuit. To achieve faster ramp down times, in exemplary embodiments of the present invention, a ramp down circuit is introduced into the power supply 135 which aids in reducing the ramp down time when an arc is detected on wire 145. For example, when the power supply 135 is turned off, a ramp down circuit opens up which introduces resistance into the circuit. The resistance can be of a type which reduces the flow of current to below 50 amps in 50 microseconds from a hot-wire current of 400 amps. A simplified example of such a circuit is shown in FIG. 6A. In FIG. 6A, the inductor 605 of circuit 600 represents the inductance in the power supply 135, the wire 145 and workpiece 115. The circuit 600 has a resistor 601 and a switch 603 placed into the welding circuit such that when the power supply 135 is operating and providing current, the switch 603 is closed. However, when the power supply 135 is stopped (or the output power is reduced) after the micro-arc period 215, as discussed above, the switch 603 is opened in order to force the induced current through the resistor 601. As seen in FIG. 6B, without the circuit 600, the ramp down of the induced current 218 takes longer than if the ramp down of induced current 216, which was sent through circuit 600 and resistor 601. This is because the resistor 601 greatly increases the resistance of the circuit and ramps down the current at a quicker pace. Depending on the system, by using circuit 600 (or a similar circuit), the ramp down of the induced current can be 3 to 10 times faster than if no such circuit was used. For example, if the normal ramp down time without circuit 600 is 300 microseconds, the ramp down time with circuit 600 can be reduced to 50 microseconds or faster.

Figure 6C:
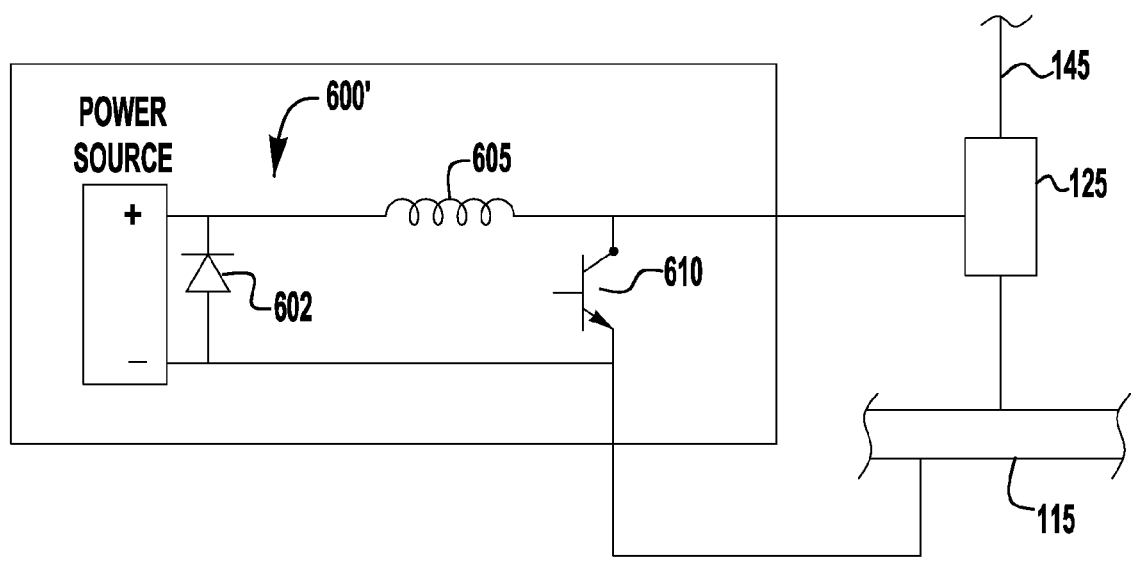
FIG. 6C illustrates a schematic diagram of an exemplary micro-arc suppression circuit that can be used in the system of FIG. 1.

FIG. 6C illustrates a suppression circuit 600' that is consistent with the present invention. As in the above exemplary embodiment, the inductor 605 represents the inductance in the power supply 135, the wire 145 and workpiece 115. A transistor switch 610, which can be, e.g., an IGBT switch, is placed at the output of the power supply 135 such that, when the switch 610 is on (closed), the induction current through inductor 605 is shorted through freewheeling diode 602 and the switch 610. Because the switch 610 shorts the contact tube 125 to the workpiece 115, the induction current will not go through the wire 145 and power the micro arc. Thus, the micro-arc will be suppressed and the wire 145 will once again short to the workpiece 115 via molten puddle 112. That is, in contrast to induction suppression circuit 600, suppression circuit 600' suppresses the micro-arc rather than the induction current per se. However, in some embodiments, a resistor (not shown) can be added in series with the switch 610 to suppress the induction current while also suppressing the arc. Of course, a combination of resistor 601/switch 603 and switch 610 can also be used to suppress both the induced current and micro-arc. During normal operation the switch 610 is open and current flows to the wire 145 via contact tube 125. However, when the power supply 135 is stopped (or the output power is reduced) after the micro-arc period 215, as discussed above, the switch 610 can be closed in order for the induced current to bypass the wire 145 and suppress the micro-arc. Once the micro-arc is extinguished and the wire 145 is shorted to the workpiece 115 via molten puddle 112, the switch 610 can be opened to reestablish the normal current path.

In some of the exemplary embodiments, the applications relate to controlling heat input at the sidewalls of a weld joint or at the edge of a previous cladding layer. However, the present invention is not so limited. The present invention can be used to control heat input in other applications such as, e.g., maintaining the weld puddle 112 temperature at a desired value. In such exemplary embodiments, the welding system can include the weld puddle temperature as a feedback in order to control the heat input to the weld puddle 112. For example, the weld puddle temperature can be an input to the controller 195 from sensor 117 (see FIG. 1). Based on the feedback from sensor 117, the controller 195 can maintain the weld puddle 112 temperature (or an area adjacent to the weld puddle 112) at a desired value by, e.g., switching between heating process 502 and micro-arc process 504. In addition, the temperature can be controlled (or further controlled) by changing the duration t of the micro-arcs, adjusting the "dead time" when no current is flowing through wire 145, and/or changing the frequency of the micro-arcs as discussed above. The sensor 117 can be of a type that uses a laser or infrared beam, which is capable of detecting the temperature of a small area—such as the weld puddle 112 or an area around weld puddle 112—without contacting the weld puddle 112 or the workpiece 115. Of course, other methods can be used to control the switch from a heating process to a micro-arc process such as, e.g., a time-based switching operation (switching every few ms) or a distance-based switching operation (switching every few cm) in order to control the heat input to the process. Further, exemplary embodiments of the present invention can also be used to reduce heat in a two-arc tandem system. In this case, one of the two arcs can be suppressed, as desired, to go from a full arc operation to a hot wire operation with controlled micro arcs as discussed in the exemplary embodiments above. The micro-arcs will allow the tandem system to maintain enough heat input to attain a desirable bead profile. Such exemplary systems can be used in applications requiring high fill/low heat input joints, e.g., to fill a gap or on thin material.

It should be noted that although a GMAW system is shown and discussed regarding depicted exemplary embodiments with DC and variable polarity hot wire current waveforms, exemplary embodiments of the present invention can also be used with TIG, PAW, Laser Welding, FCAW, MCAW, and SAW systems in applications involving joining/welding, cladding, brazing, and combinations of these, etc.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding system, said system comprising:
   a high intensity energy source to create a molten puddle on a surface of a workpiece;
   a wire feeder that feeds a wire to said molten puddle via a contact tube;
   a power supply that outputs a first heating current during a first mode of operation and a second heating current during a second mode of operation, said power supply providing said first heating current or said second heating current to said wire via said contact tube;
   a controller that initiates said first mode of operation in said power supply to heat said wire to a desired temperature and switches said power supply from said first mode of operation to said second mode of operation to create a micro-arc, said micro-arc created between said wire and said workpiece; and
   a ramp down circuit to suppress at least one of an induced current and said micro-arc when said output of said power supply is off or reduced in power to extinguish said micro-arc;
   wherein said second mode of operation provides at least one of an increased heat input to said molten puddle and an increased agitation of said molten puddle relative to said first mode of operation.

2. The welding system of claim 1, wherein said ramp down circuit introduces a resistance in a current path of said induced current to suppress said induced current.

3. The welding system of claim 2, wherein said resistance is such that a flow of current can be reduced below 50 amps in 50 microsecond from a current of 400 amps.

4. The welding system of claim 2, wherein said ramp down circuit ramps down said induced current three to ten times faster than a welding system with no ramp down circuit.

5. The welding system of claim 1, wherein said ramp down circuit comprises a switch that shorts said contact tube to said workpiece such that said induced current bypasses said wire in order to suppress said micro-arc.

6. The welding system of claim 4, wherein said ramp down circuit comprises a resistor that suppresses said induced current.

7. The welding system of claim 1, wherein at least one of a duration, amplitude, and frequency of said micro-arc is controlled to control said increased heat input and/or said increased agitation.

8. The welding system of claim 7, wherein at least said duration is controlled and said duration is in a range from 50 microseconds to 2 milliseconds.

9. The welding system of claim 1, wherein said second heating current is one of a steady-state current, a pulsed DC current, and variable polarity current.

10. The welding system of claim 9, wherein said second heating current is said pulsed DC current,
wherein said pulsed DC current comprises a series of pulses with each said pulse having a pulse current value, and
wherein said pulses of said series of pulses are separated by background current segments with each background current segment having a background current value that is lower than said pulse current values of adjacent pulses of said series of pulses.

11. A method of welding, said method comprising:
creating a molten puddle on a surface of a workpiece;
feeding a wire to said molten puddle via a contact tube;
outputting a first heating current during a first mode of operation and a second heating current during a second mode of operation to said contact tube;
initiating said first mode of operation to heat said wire to a desired temperature;
switching from said first mode of operation to said second mode of operation to create a micro-arc, said micro-arc created between said wire and said workpiece;
extinguishing said micro-arc after a desired duration by stopping said second heating current; and
suppressing at least one of an induced current and said micro-arc when said second heating current is stopped,
wherein said second mode of operation provides at least one of an increased heat input to said molten puddle and an increased agitation of said molten puddle relative to said first mode of operation.

12. The method of claim 11, wherein said suppressing comprises introducing a resistance in a current path of said induced current to suppress said induced current.

13. The method of claim 12, wherein said resistance is such that a flow of current can be reduced below 50 amps in 50 microsecond from a current of 400 amps.

14. The method of claim 12, wherein said suppressing of said induced current ramps down said induced current three to ten times faster than if no external suppression is applied.

15. The method of claim 11, wherein said suppressing comprises shorting said contact tube to said workpiece such that said induced current bypasses said wire in order to suppress said micro-arc.

16. The welding system of claim 15, wherein said suppressing further comprises introducing a resistance in a current path of said induced current to suppress said induced current.

17. The method of claim 11, further comprising:
controlling at least one of a duration, amplitude, and frequency of said micro-arc to control said increased heat input and/or said increased agitation.

18. The method of claim 17, wherein said controlling includes controlling said duration in a range from 50 microseconds to 2 milliseconds.

19. The method of claim 11, wherein said second heating current is one of a steady-state current, a pulsed DC current, and variable polarity current.

20. The method of claim 19, wherein said second heating current is said pulsed DC current,
wherein said pulsed DC current comprises a series of pulses with each said pulse having a pulse current value, and
wherein said pulses of said series of pulses are separated by background current segments with each background current segment having a background current value that is lower than said pulse current values of adjacent pulses of said series of pulses.

* * * * *